United States Patent
Ogura

[19]

[11] Patent Number: 6,138,138
[45] Date of Patent: Oct. 24, 2000

[54] HIGH SPEED MULTIPLE DETERMINATION APPARATUS

[75] Inventor: Naoyuki Ogura, Tokyo, Japan

[73] Assignee: NEC Corporation, Tokyo, Japan

[21] Appl. No.: 09/073,404

[22] Filed: May 7, 1998

[30]     Foreign Application Priority Data

May 8, 1997   [JP]   Japan ................................. 9-118018

[51] Int. Cl.[7] ................................................ G06F 7/52
[52] U.S. Cl. ........................................ 708/656; 708/650
[58] Field of Search ........................ 708/650, 653–656

[56]              References Cited

U.S. PATENT DOCUMENTS

| 5,381,380 | 1/1995 | Yoshida | 708/656 |
| 5,485,414 | 1/1996 | Yao et al. | 708/655 |
| 5,638,314 | 6/1997 | Yoshida | 708/656 |
| 5,818,745 | 10/1998 | Sheaffer | 708/656 |
| 5,903,486 | 5/1999 | Curtet | 708/656 |

FOREIGN PATENT DOCUMENTS 8-202534   8/1996   Japan .

*Primary Examiner*—Tan V. Mai
*Attorney, Agent, or Firm*—McGinn & Gibb, P.C.

[57]            ABSTRACT

In a multiple determination apparatus for determining whether or not a dividend is a multiple of a divisor which is represented by $D=\alpha \cdot 2^r$ where $\alpha$ is an odd number and r is 0, 1, 2, ..., a non-zero determination circuit determines whether or not a remainder of a division of the dividend by $2^r$ is zero. A selector circuit replaces a first number with a quotient of the division. An operational circuit determines whether or not a greatest common measure between $\alpha$ and the first number coincides with $\alpha$, when the remainder is zero. Thus, it is determined that the dividend is a multiple of the divisor when the greatest common measure coincides with $\alpha$.

11 Claims, 10 Drawing Sheets

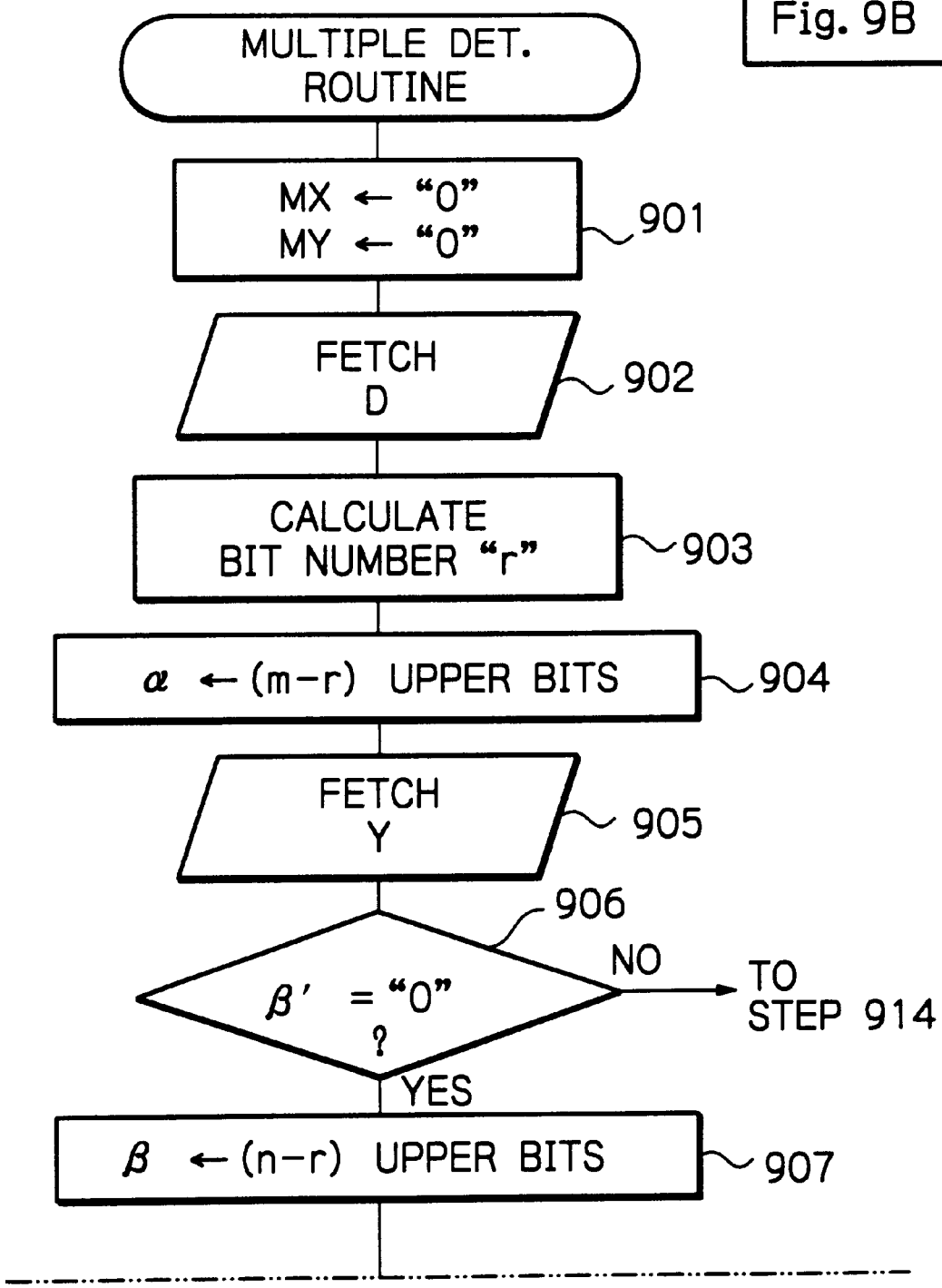

HIGH SPEED MULTIPLE DETERMINATION APPARATUS

BACKGROUND OF THE INVENTION

1. Field of the Invention

The present invention relates to a multiple determination apparatus used in a circuit for detecting an error of a digital signal in a packet communication system or the like.

2. Description of the Related Art

For example, in moving picture communications, moving picture data is divided into 188-byte moving picture expert image coding group phase 2 (MPEG2) transport stream packets, and is stored in asynchronous transfer mode (ATM) packets which are transmitted. In a receiving side that receives such ATM packets, it is required that a byte length of each ATM packet is a multiple of 188. For this purpose, a multiple determination apparatus is provided.

A first prior art multiple determination apparatus includes a shift circuit for shifting a dividend and a downcounter for counting the bit length of the dividend in addition to an operational circuit formed by selector circuits, a memory circuit and a subtracter circuit. This will be explained later in detail.

Therefore, in the first prior art multiple determination apparatus, since the shift register and the downcounter are required, the hardware of the apparatus is increased, which increases the manufacturing cost.

Since the selector circuit connected to the subtracter circuit is operated by the borrow signal of the subtracter circuit, it is impossible to increase the operation speed of the selector circuit, so that the operation speed of the apparatus cannot be increased. Further, since the number of clock signals is as many equal to the effective bit length of the dividend plus 1, the entire operation time is increased, which further decreases the operation speed.

In a second prior art multiple determination apparatus (see JP-A-8-202534), the shift circuit and the downcounter of the first prior art multiple determination apparatus are not provided, which decreases the hardware. This will be also explained later in detail.

In the second prior art multiple determination apparatus, however, since the number of clock signals is remarkably increased, the entire operation time is remarkably increased, which decreases the operation speed.

In a third prior art multiple determination apparatus, a table showing relationships between all possible dividends and data indicating whether or not a multiple of a certain divisor is provided, thus remarkably increasing the operation speed.

In the third prior art multiple determination apparatus, however, a memory for storing such a table is remarkably enlarged. For example, if each dividend is constructed by n bits, a $2^n$ bits capacity memory is required. That is, if n=16, $2^{16}$=65000 bits. Thus, the hardware is increased.

SUMMARY OF THE INVENTION

It is an object of the present invention to increase the operation speed of a multiple determination apparatus without increasing the hardware.

According to the present invention, in a multiple determination apparatus for determining whether or not a dividend is a multiple of a divisor which is represented by $D=\alpha \cdot 2^r$ where $\alpha$ is an odd number and r is 0, 1, 2, . . . , a non-zero determination circuit determines whether or not a remainder of a division of the dividend by $2^r$ is zero. A selector circuit replaces a first number with a quotient of the division. An operational circuit determines whether or not a greatest common measure between $\alpha$ and the first number coincides with $\alpha$, when the remainder is zero. Thus, it is determined that the dividend is a multiple of the divisor when the greatest common measure coincides with $\alpha$.

BRIEF DESCRIPTION OF THE DRAWINGS

The present invention will be more clearly understood from the description as set forth below, as compared with the prior art, with reference to the accompanying drawings, wherein:

FIGS. 9A and 9B are flowcharts showing the operation of the control circuit of FIG. 8.

DESCRIPTION OF THE PREFERRED EMBODIMENTS

Prior to describing the preferred embodiments, prior art multiple determination apparatuses will be explained with reference to FIGS. 1, 2, 3 and 4. Here, "D" designates a divisor, and "Y" is a dividend.

Figure 1:
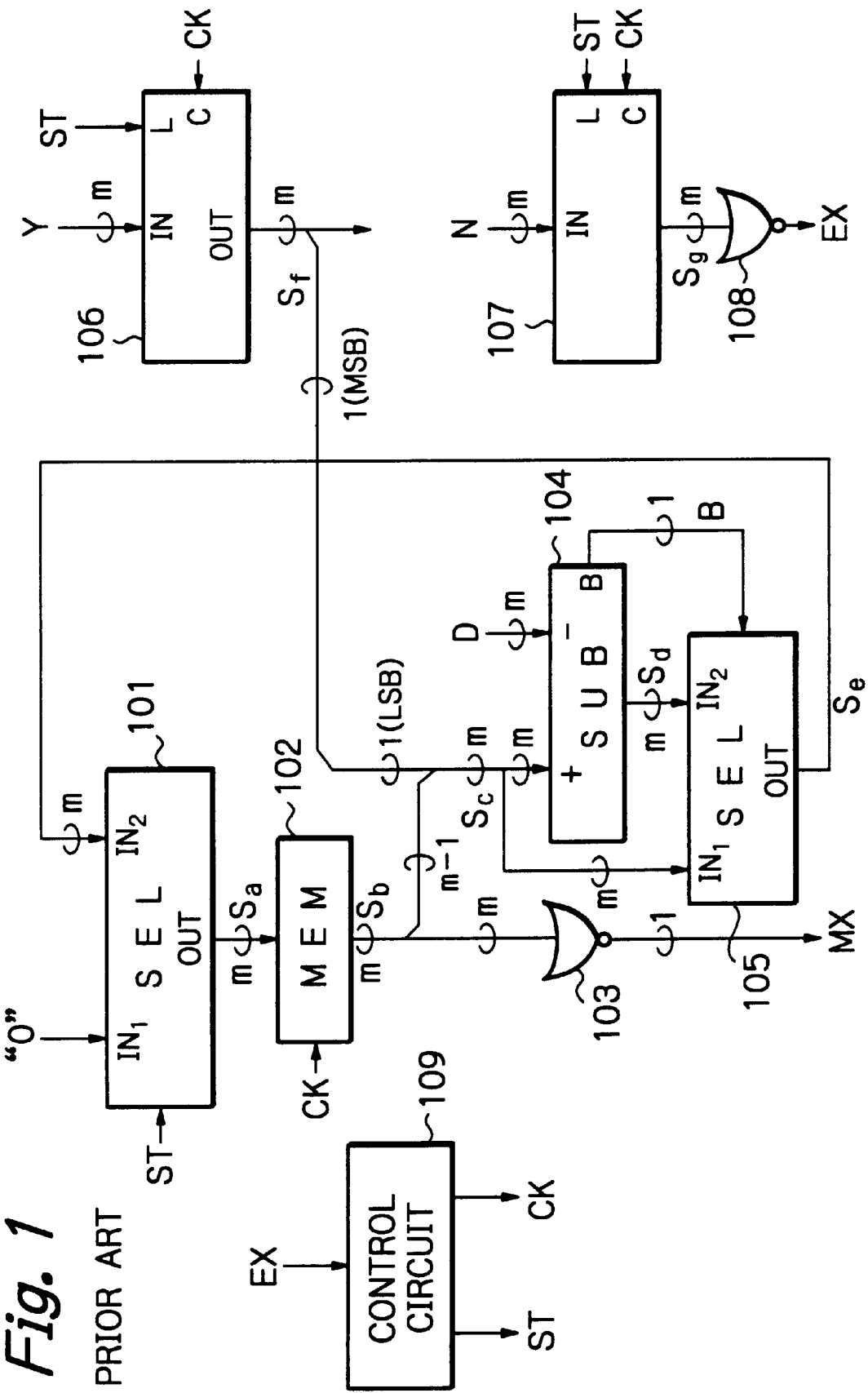
FIG. 1 is a block circuit diagram illustrating a first prior art multiple determination apparatus.

In FIG. 1, which illustrates a first prior art multiple determination apparatus, reference numeral 101 designates an m-bit selector circuit for selecting "0" at an input $IN_1$ or a signal $S_e$ at an input $IN_2$ to generate an m-bit output signal $S_a$ at an output OUT in accordance with a start signal ST. In this case, if ST="0" (high), then $S_a$="0", while, if ST="0" (low), then $S_a=S_e$. Also, an m-bit memory circuit 102 is connected to the output of the selector circuit 101. The memory circuit 102 stores the output signal $S_a$ in synchronization with a clock signal CK. Further, a determination circuit 103 is connected to the output of the memory circuit 102. The determination circuit 103 includes a NOR circuit. Therefore, if the output signal $S_b$ of the memory circuit 102 is "0"(m-bit), the determination circuit 103 generates a multiple determination signal MX (="1"). On the other hand, if the output signal $S_b$ of the memory circuit 102 is not "0"(m-bit), the determination circuit 103 generates a multiple determination signal MX (="0").

A m-bit signal $S_c$ is formed by the lower (m-1) bits of the signal $S_b$ as upper (m-1) bits and the most significant bit (MSB) of an m-bit signal $S_f$ as a least significant bit (LSB). The signal $S_c$ is supplied to a positive input of a subtracter circuit 104, while the divisor D is supplied to a negative input of the subtracter circuit 104. The subtracter circuit 104 generates an m-bit output signal $S_d$ (=$S_c$−D). In addition, if $S_c$<D, the subtracter circuit 104 generates a 1-bit borrow signal B (="1").

The m-bit signal $S_c$ and the m-bit signal $S_d$ are supplied to an m-bit selector circuit 105. The selector circuit 105 is controlled by the borrow signal B of the subtracter circuit 104 to generate the signal $S_e$. In this case, if B="0", $S_a$=$S_d$. On the other hand, if B="1", $S_a$=$S_c$.

A shift register 106 is operated by the start signal ST and the clock signal CK to generate the m-bit signal $S_f$. That is, if ST="1" (high), the dividend Y is loaded in the shift register 106 in synchronization with the clock signal CK. On the other hand, if ST="0" (low), the content of the shift register 106 is left-shifted by one bit in synchronization with the clock signal CK. In this case, note that the effective bit length of the dividend Y is represented by "n".

A downcounter 107 is also operated by the start signal ST and the clock signal CK to generate an m-bit signal $S_g$. That is, if ST="1" (high), the bit length "n" of the dividend Y is loaded in the downcounter 107 in synchronization with the clock signal CK. On the other hand, if ST="0" (low), the content of the downcounter 107 is decremented by 1 in synchronization with the clock signal CK. Also, a determination circuit 108 is connected to the output of the downcounter 107. The determination circuit 108 includes a NOR circuit. Therefore, if the output signal $S_g$ of the downcounter 107 is "0" (m-bit), the determination circuit 108 generates an end signal EX (="1"). On the other hand, if the output signal $S_g$ of the downcounter 107 is not "0" (m-bit), the determination circuit 108 generates an end determination signal EX (="0").

The start signal ST and the clock signal CK are generated by a control circuit 109 that receives the end signal EX. The control circuit 109 is constructed by a microprocessor, a read-only memory (ROM), a random access memory (RAM) and the like.

The operation of the control circuit 109 is explained next with reference to FIG. 2 which shows a multiple determination routine.

First, at step 201, the control circuit 109 causes the start signal ST to be "1". As a result, the selector circuit 101 selects the value "0" at the input $IN_1$, so that the signal $S_a$ becomes "0".

Next, at step 202, the control circuit 109 generates a clock signal CK while the start signal ST is maintained at "1". Therefore, the signal $S_a$ (="0") is stored in the memory circuit 102; in this case, the memory circuit 102 is cleared. Also, the dividend Y is loaded in the shift register 106, and simultaneously, the effective bit length "n" of the dividend Y is loaded in the downcounter 107.

In this state, the subtracter circuit 104 subtracts the divisor D from the signal $S_c$ formed by the lower (m-1) bits of the output signal $S_b$ of the memory circuit 102 and the MSB of the output signal $S_f$ of the shift register 106, to transmit the output signal $S_d$ to the input $IN_2$ of the selector circuit 105. Also, the signal $S_c$ is transmitted directly to the input $IN_1$ of the selector circuit 105. Further, the borrow signal B of the subtracter 104 is transmitted by a control signal to the selector circuit 105. As a result, the selector circuit 105 transmits the output signal $S_e$ to the selector circuit 101. Thus, after a predetermined time corresponding to the operation of the subtracter circuit 104 and the selector circuit 105 has passed, the control proceeds to step 203.

At step 203, the control circuit 109 causes the start signal ST to be "0". As a result, the selector circuit 101 selects the output signal $S_e$ of the selector circuit 105 at the input $IN_2$, so that the signal $S_a$ becomes equal to $S_e$.

Next, at step 204, the control circuit 109 generates a clock signal CK while the start signal ST is maintained at "0". Therefore, the signal $S_a$ (=$S_e$) is stored in the memory circuit 102. Also, the Y content of the shift register 106 is left-shifted by one bit. Simultaneously, the content of the downcounter 107 is decremented by 1.

Also, in this state, the subtracter circuit 104 subtracts the divisor D from the signal $S_c$ formed by the lower (m-1) bits of the output signal $S_b$ of the memory circuit 102 and the MSB of the output signal $S_f$ of the shift register 106, to transmit the output signal $S_d$ to the input $IN_2$ of the selector circuit 105. Also, the signal $S_c$ is transmitted directly to the input $IN_1$ of the selector circuit 105. Further, the borrow signal B of the subtracter 104 is transmitted by a control signal to the selector circuit 105. As a result, the selector circuit 105 transmits the output signal $S_d$ to the selector circuit 101. Thus, after a time period corresponding to the operation of the subtracter circuit 104 and the selector circuit 105 has passed, the control proceeds to step 205.

The operation of step 204 is repeated by step 205 until the end signal EX becomes "1".

Figure 2:
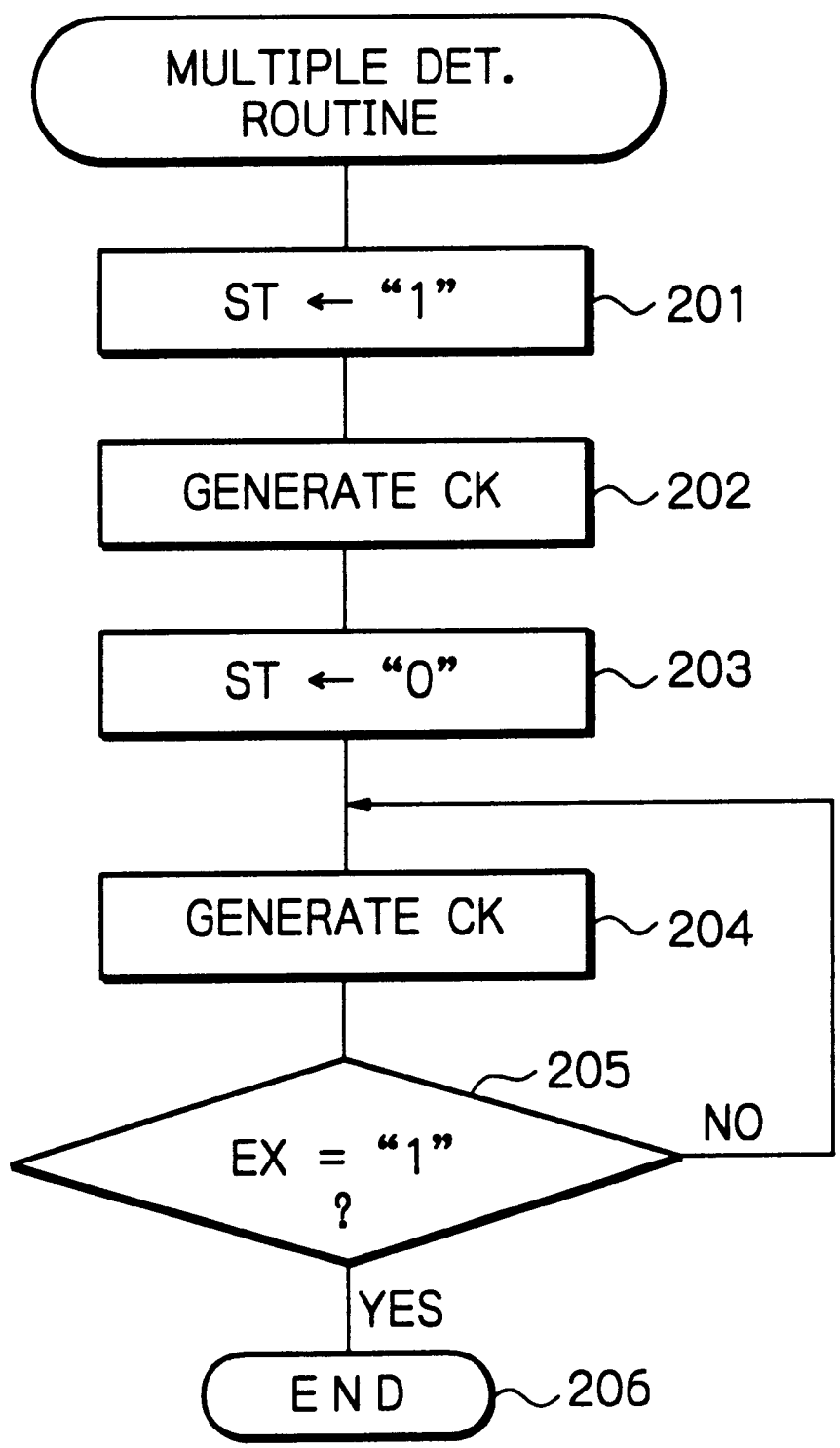
FIG. 2 is a flowchart showing the operation of the control circuit of FIG. 1.

Finally, the routine as shown in FIG. 2 is completed by step 206. In this state, if MX="1", this means that the dividend Y is a multiple of the divisor D. On the other hand, if MX="0", this means that the dividend Y is not a multiple of the divisor D.

An example of the operation of the control circuit 109 is further explained next. In this case, assume that

Y=10111000 (="184")

D=00000110 (="6")

Therefore, m=8. Also, the effective bit length n of the dividend Y is n=00001000 (="8")

When the operation at steps 201 and 202 is carried out, the value of the signal $S_g$ is $S_g$=00001000 (="8")

Also, the values of the other signals are as follows:

$S_a$=00000000

$S_b$=00000000

$S_f$=10111000

$S_c$=00000001

D==00000110

$S_d$=11111011

B="1"

$S_a$=00000001

Next, when the operation at steps 203 and 204 is carried out, the value of the signal $S_g$ is $S_g$=00000111 (="7")

Also, the values of the other signals are as follows:

$S_a$=00000001

$S_b$=00000001

$S_f$=01110000

$S_c$=00000010

D==00000110

$S_e$=11111100

B="1"

$S_a$=00000010

Next, when the operation at step 204 is again carried out, the value of the signal $S_g$ is $S_g$=00000110 (="6")

Also, the values of the other signals are as follows:

$S_a$=00000010
$S_b$=00000010
$S_f$=11100000
$S_c$=00000101
D==00000110
$S_d$=11111111
B="1"
$S_e$=00000101

Next, when the operation at step 204 is again carried out, the value of the signal $S_g$ is $S_g$=00000101 (="5")

Also, the values of the other signals are as follows:

$S_a$=00000101
$S_b$=00000101
$S_f$=11000000
$S_c$=00001011
D==00000110
$S_d$=00000101
B="0"
$S_e$=00000101

Next, when the operation at step 204 is again carried out, the value of the signal $S_g$ is $S_g$=00000100 (="4")

Also, the values of the other signals are as follows:

$S_a$=00000101
$S_b$=00000101
$S_f$=10000000
$S_c$=00001011
D==00000110
$S_e$=00000101
B="0"
$S_a$=00000101

Next, when the operation at step 204 is again carried out, the value of the signal $S_g$ is $S_g$=00000011 (="3")

Also, the values of the other signals are as follows:

$S_a$=00000101
$S_b$=00000101
$S_f$=00000000
$S_c$=00001010
D==00000100
$S_d$=00000100
B="0"
$S_e$=00000100

Next, when the operation at step 204 is again carried out, the value of the signal $S_g$ is $S_g$=00000010 (="2")

Also, the values of the other signals are as follows:

$S_a$=00000100
$S_b$=00000100
$S_f$=00000000
$S_c$=00001000
D==00000110
$S_d$=00000010
B="0"
$S_a$=00000010

Next, when the operation at step 204 is again carried out, the value of the signal $S_g$ is $S_g$=00000001 (="1")

Also, the values of the other signals are as follows:

$S_a$=00000010
$S_b$=00000010
$S_f$=00000000
$S_c$=00000100
D==00000110
$S_d$=11111110
B="1"
$S_e$=00000100

Finally,, when the operation at step 204 is again carried out, the value of the signal $S_g$ is $S_g$=00000000 (="0")

Also, the values of the other signals are as follows:

$S_a$=00000100
$S_b$=00000100
$S_f$=00000000
$S_c$=00001000
D==00000110
$S_d$=00000010
B="0"
$S_e$=00000010

In this state, since the value of the signal $S_g$ is "0" so that the end signal EX becomes "1", the operation of the control circuit 109 is completed by step 206. In this case, since the value of the signal $S_b$ (="4") shows a remainder of 184÷6, the multiple determination signal MX is equal to "0".

In the multiple determination apparatus of FIG. 1, however, since the shift register 106 and the downcounter 107 are required, the hardware of the apparatus is increased, which increases the manufacturing cost.

In addition, since the selector circuit 105 is operation be the borrow signal B of the subtracter 104, it is impossible to increase the operation speed of the selector circuit 105, so that the frequency of the clock signal CK cannot be increased. Further, since the number of cycles at the clock signal CK is equal to the effective bit length "n" of the dividend Y plus 1, the entire operation time is increased, which further decreases the operation speed.

Figure 3:
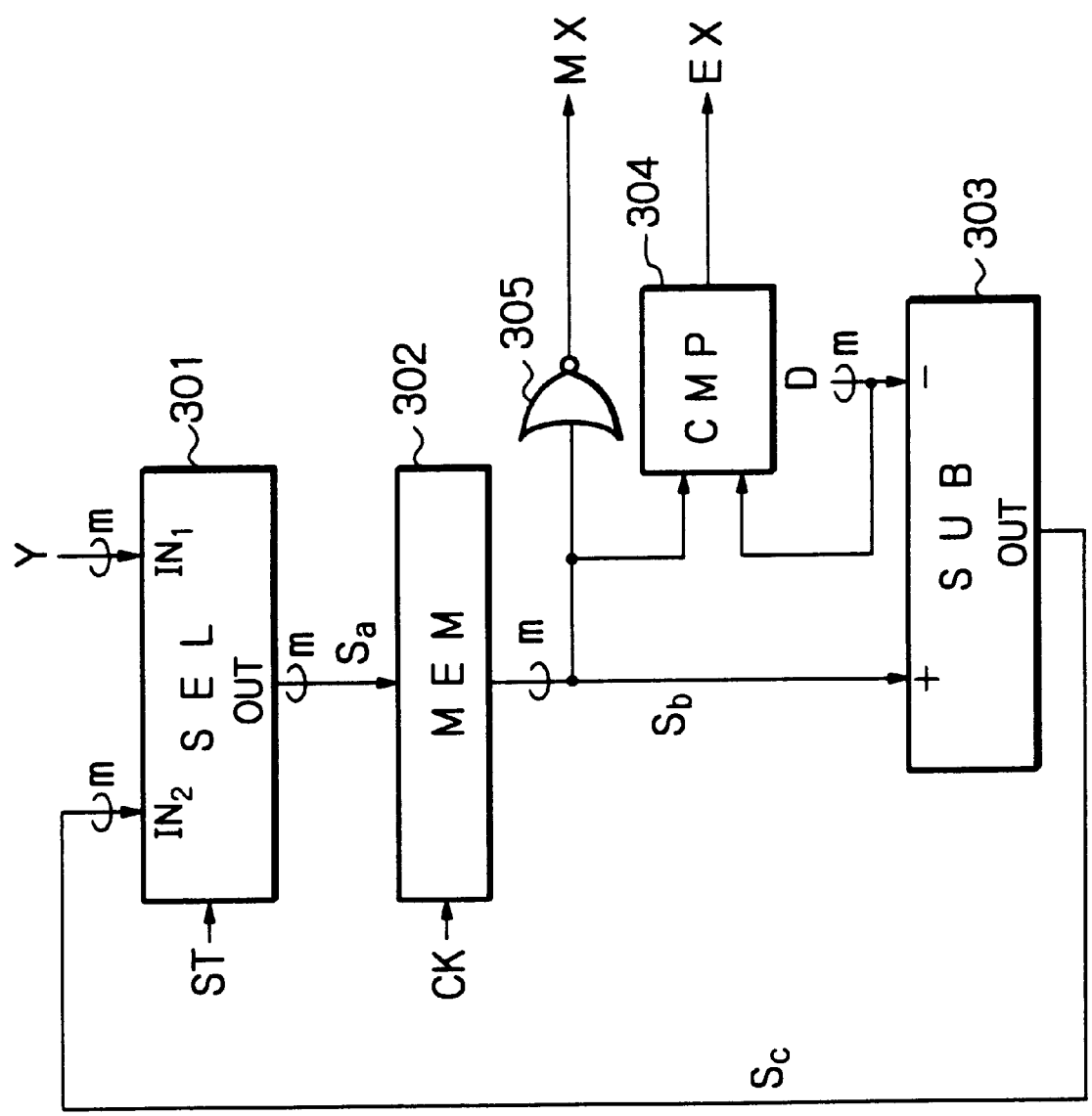
FIG. 3 is a block circuit diagram illustrating a second prior art multiple determination apparatus.
Figure 3:
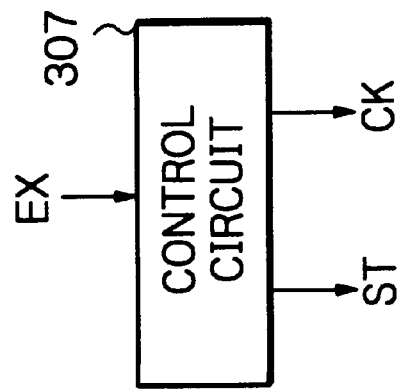

In FIG. 3, which illustrates a second prior art multiple determination apparatus (see JP-A-8-202534), reference numeral 301 designates an m-bit selector circuit for selecting the dividend Y at an input $IN_1$ or a signal $S_c$ at an input $IN_2$ to generate an m-bit output signal $S_a$ at an output OUT in accordance with a start signal ST. In this case, if ST="1" (high), then $S_a$=Y, while, if ST="0" (low), then $S_z$=$S_c$. Also, an m-bit memory circuit 302 is connected to the output of the selector circuit 301. The memory circuit 302 stores the output signal $S_a$ in synchronization with a clock signal CK. Further, an m-bit subtracter circuit 303 is connected to the output of the memory circuit 302. The subtracter circuit 303 subtracts the divisor D from the value of the output signal $S_b$ of the memory circuit 302 to generate the signal $S_c$.

Also, an m-bit comparator circuit 304 compares the value of the signal $S_b$ with the divisor D. In this case, if $S_b \geq D$, the comparator 304 generates an end signal EX (="0"). On the other hand, if $S_b$<D, the comparator 304 generates an end signal EX (="1").

Further, a determination circuit 305 is connected to the output of the memory circuit 302. The determination circuit 305 includes a NOR circuit. Therefore, if the output signal $S_b$ of the memory circuit 302 is "0"(m-bit), the determination circuit 305 generates a multiple determination signal MX (="1"). On the other hand, if the output signal $S_b$ of the memory circuit 302 is not "0"(m-bit), the determination circuit 305 generates a multiple determination signal MX (="0").

The start signal ST and the clock signal CK are generated by a control circuit 307 that receives the end signal EX. The control circuit 307 is constructed by microprocessor, a ROM, a RAM and the like.

The operation of the control circuit 307 is explained next with reference to FIG. 4 which is a multiple determination routine.

First, at step 401, the control circuit 307 causes the start signal ST to be "1". As a result, the selector circuit 301 selects the dividend "Y" at the input $IN_1$, so that the signal $S_a$ becomes Y.

Next, at step 402, the control circuit 307 generates a clock signal CK while the start signal ST is maintained a at "1". Therefore, the signal $S_a$ (=Y) is stored in the memory circuit 302.

In this state, the subtracter circuit 303 subtracts the divisor D from the dividend to transmit the output signal $S_c$ to the input $IN_2$ of the selector circuit 301. Also, the comparator 304 compares the signal $S_b$ with the divisor D, to generate the end signal EX. That is, if $S_b \geq D$, EX="1", while if $S_b<D$, EX="0". Thus, after a time period corresponding to the operation of the comparator 304 has passed, the control proceeds to step 403. At step 403, it is determined whether of or not EX="1". As a result, if EX="0", the control proceeds to step 404. Otherwise, the control proceeds directly to step 407.

At step 404, the control circuit 307 causes the start signal ST to be "0". As a result, the selector circuit 301 selects the output signal $S_a$ of the subtracter 305 at the input $IN_2$, so that the signal $S_a$ becomes equal to $S_c$.

Next, at step 405, the control circuit 307 generates a clock signal CK while the start signal ST is maintained a at "0". Therefore, the signal $S_a$ (=$S_c$) is stored in the memory circuit 302.

In this state, the subtracter circuit 303 subtracts the divisor D from the signal $S_b$ to transmit the output signal $S_c$ to the input $IN_2$ of the selector circuit 301. Also, the comparator 304 compares the signal $S_b$ with the divisor D, to generate the end signal EX. That is, If $S_b \geq D$, EX="1", while if $S_b<D$, EX="0". Thus, after a predetermined time period corresponding to the operation of the comparator 304 has passed, the control proceeds to step 406.

At step 406, it is determined whether or not EX="1". As a result, if EX="1", the control proceeds to step 407. Otherwise, the control returns to step 405.

The operation of step 405 is repeated by step 406 until the end signal EX becomes "1".

Figure 4:
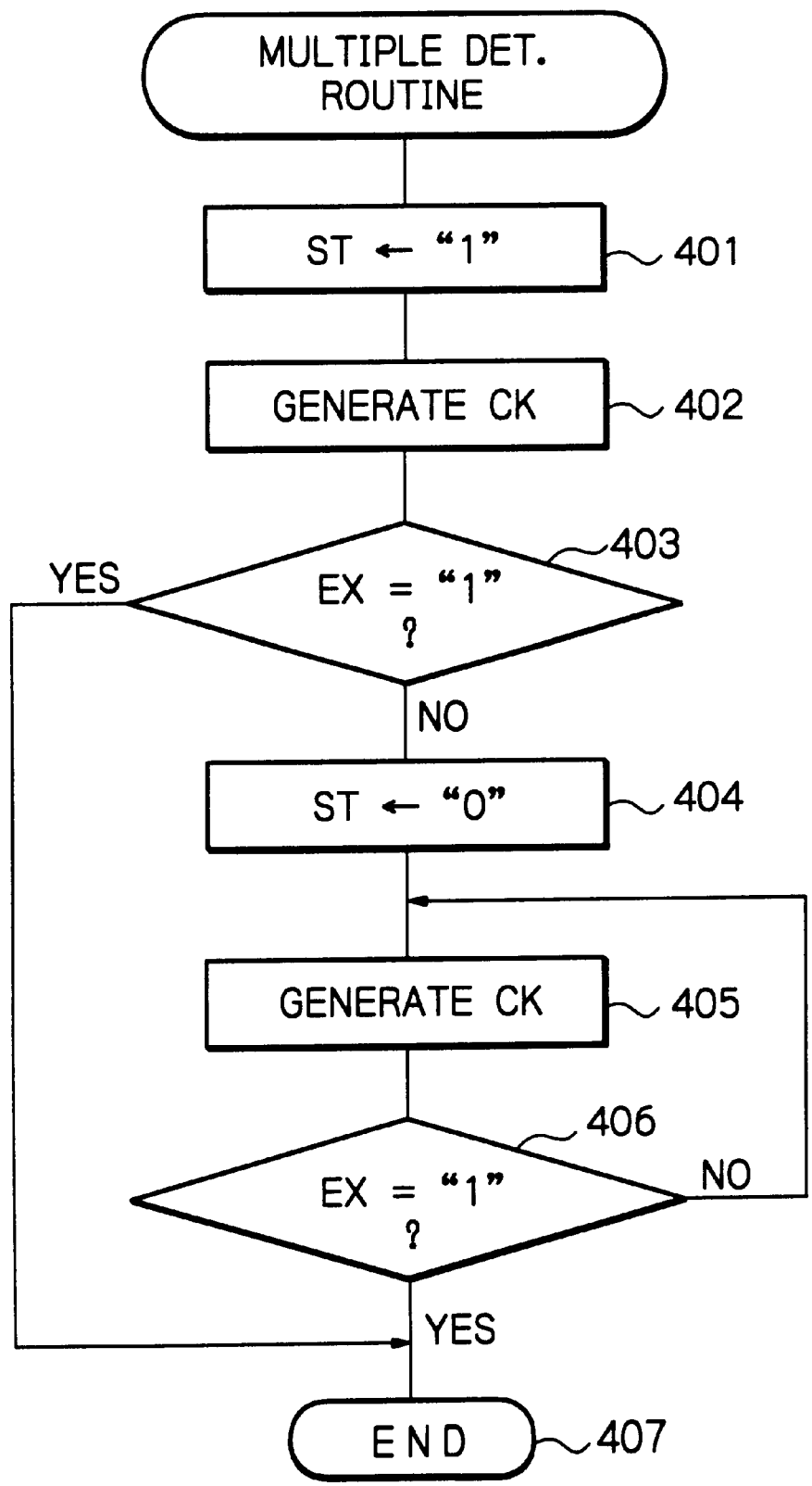
FIG. 4 is a flowchart showing the operation of the control circuit of FIG. 3.

Finally, the routine as shown in FIG. 4 is completed by step 407. In this state, if MX="1", this means that the dividend Y is a multiple of the divisor D. On the other hand, if MX="0", this means that the dividend Y is not a multiple of the divisor D.

In the multiple determination apparatus of FIG. 3, the following formulae are calculated:

$$Y_0 = Y$$
$$Y_1 = Y_0 - D$$
$$Y_2 = Y_1 - D$$
$$\vdots$$
$$Y_n = Y_{n-1} - D$$

where $0 \leq Y_n<D$. In this case, if $Y_n$="0", the dividend Y is a multiple of the divisor D, and if $Y_n \neq$"0", the dividend Y is not a multiple of the divisor D.

In the multiple determination apparatus of FIG. 3, since the shift register 106 and the downcounter 107 of FIG. 1 are not required, the hardware of the apparatus of FIG. 3 is decreased compared with the apparatus of FIG. 1.

In the multiple determination apparatus of FIG. 3, however, since the number of cycles of the clock signals CK generated is remarkably increased, the entire operation time is remarkably increased, which decreases the operation speed. For example, if the effective bit length of the dividend Y is "y" and the effective bit length of the divisor D is "d", the number of cycles of the clock signal CK generated is as many as $2^{y+4}$.

Figure 5:
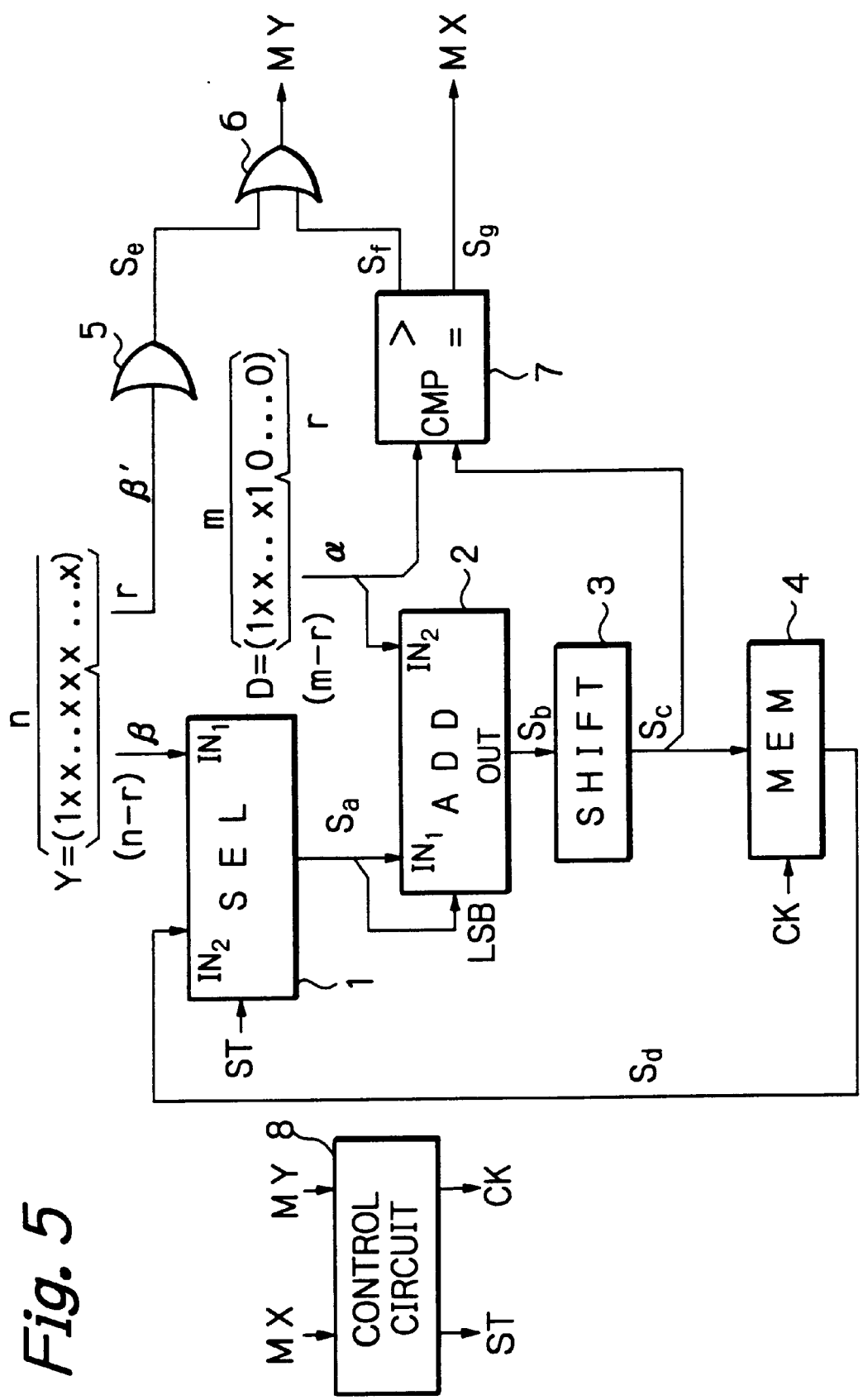
FIG. 5 is a block circuit diagram illustrating a first embodiment of the multiple determination apparatus according to the present invention.

In FIG. 5, which illustrates a first embodiment of the present invention, it is assumed that a divisor D is constructed by m bits below:

$$D = 1xx \ldots x10 \ldots 0 \qquad (1)$$

where "1XX . . . X1" is an (m-r)-bit odd number and "0 . . . 0" is an r-bit 0. Note that "r" is 0, 1, 2, . . . Also, a dividend Y is constructed by n bits as below:

$$Y = 1xx \ldots xxx \ldots x \qquad (2)$$

A selector circuit 1 selects the upper (n-r) bits (=β) of the dividend Y at an input IN, or a signal $S_d$ at an input $IN_2$ to generate an output signal $S_a$ in accordance with a start signal ST. In this case, if ST="1" (high), then $S_a=\beta$, while, if ST="0" (low), then $S_a=S_d$.

An adder circuit 2 adds the upper (m-r) bits (=α) of the divisor D to the value of the signal $S_a$ to generate an output signal $S_b$, only when the LSB of the signal $S_a$ is 1. Otherwise, i.e., when the LSB of the signal $S_a$ is 0, the output signal $S_b$ is the same as the signal $S_a$. Also, a right-shift circuit 3 right-shifts the output signal $S_b$ of the adder circuit 2 by one bit to generate an output signal $S_c$. The right-shift circuit 3 is constructed by only wirings.

Further, a memory circuit 4 is connected to the output of the right-shift circuit 3. The memory circuit 4 stores the output signal $S_c$ in synchronization with a clock signal CK.

A non-zero determination circuit 5 receives the lower r bits of the dividend Y. The non-zero determination circuit 5 is constructed by an OR circuit. Therefore, when at least one of the lower r bits of the dividient Y is 1, the output signal $S_a$ of the non-zero determination circuit 5 is "1" (high). As a result, an OR circuit 6 that receives the output signal $S_a$ of the non-zero determination circuit generates a non-multiple determination signal MY(="1").

Additionally, a comparator 7 compares the output signal $S_c$ of the right-shift circuit 3 with that of the divisor D. As a result, when $S_c<\alpha$, then $S_f$="1" (high), so that the non-multiple determination signal MY becomes "1". On the other hand, when $S_c=\alpha$, $S_g$="1" (high), so that a multiple determination signal MX becomes "1". Note that, if $S_c>\alpha$, the output signals $S_f$ and $S_g$ of the comparator 7 both remain "0" (low).

The start signal ST and the clock signal CK are generated by a control circuit 8 that receives the multiple determination MX and the non-multiple determination MY.

The principle of the present invention is explained next. The formula (1) of the divisor D can be replaced by $$D = \alpha \cdot 2^r \qquad (3)$$

where r is an odd number. Also, the formula (2) of the dividend Y can be replaced by $$Y=\beta \cdot 2^r+\beta' \quad (4)$$

If both of the two following conditions (i) and (ii) are satisfied, it can state that the dividend Y is a multiple of the divisor D:

$$(i) \beta'=0 \quad (5)$$

(ii) β is a multiple of α.

The condition (ii) can be replaced by (ii)' α is a greatest common measure (GCM) between α and β, i.e., $$\alpha = GCM(\alpha, \beta) \quad (6)$$

Since GCM (α, β)=GCM(α, β+α), the formula (6) is replaced by $$\alpha = GCM(\alpha, \beta+\alpha) \quad (7)$$

On the other hand, generally, GCM (α, β)=GCM(α, β·δ)=GCM (α·β/δ)

where δ is not a measure of α. Therefore, since 2 is not a measure of 60 (odd number), the formula (7) is replaced by $$\alpha = GCM(\alpha, (\beta+\alpha)/2) \quad (8)$$

In FIG. 5, the output signal $S_e$ of the non-zero determination circuit 5 shows whether or not the formula (5) is satisfied. That is, if the formula (5) is not satisfied, the non-multiple determination signal MY is caused to be "1". Also, the calculation ((β+α)/2 in the formula (8) is carried out by the adder circuit 2 and the right-shift circuit 3. Then, if the comparator 7 determines that the formula (8) is satisfied, the output signal $S_g$ is caused to be "1", i.e., the multiple determination signal MX is caused to be "1". Note that the operation of the adder circuit 2, the right-shift circuit 3 and the comparator 7 is repeated until $S_c \leq \alpha$. In this case, the formula (8) varies as follows:

$$\alpha = GCM(\alpha, \beta/4 - 3\alpha/4)$$
$$\alpha = GCM(\alpha, \beta/8 + 7\alpha/8)$$
$$\vdots$$

Figure 6:
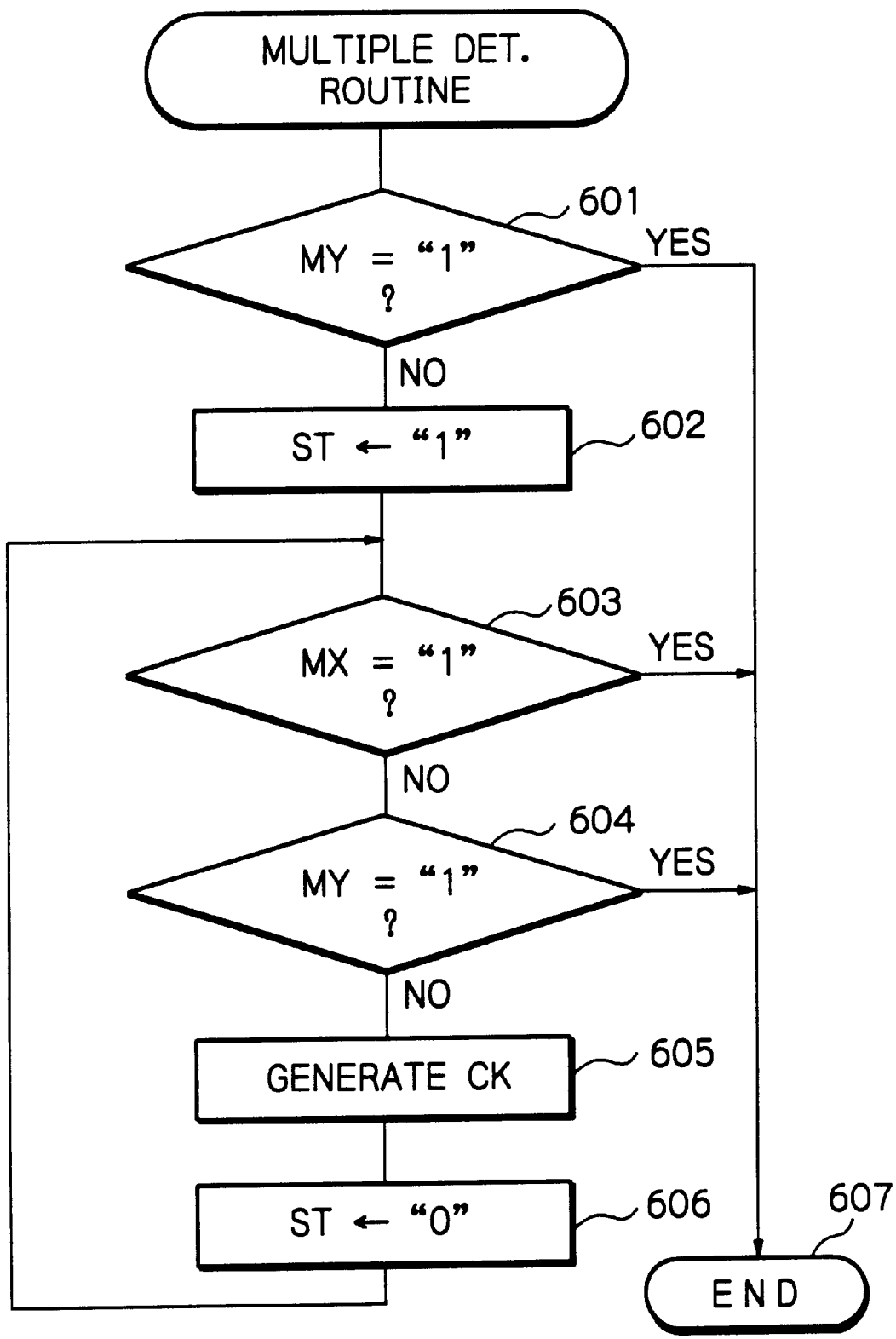
FIG. 6 is a flowchart showing the operation of the control circuit of FIG. 5.

The operation of the control circuit 8 is explained next with reference to FIG. 6 which is a multiple determination routine.

First, at step 601, it is determined whether or not the non-multiple determination signal MY is "1". As a result, only when the non-multiple determination signal MY is "0", does the control proceeds to step 602. Otherwise, the control proceeds directly to step 607.

Next, at step 602, the control circuit 8 generates a start signal ST. As a result, the selector circuit 1 selects β of the dividend Y at the input $IN_1$, so that the signal $S_a$ becomes β.

In this state, when the LSB of the signal $S_a$ is "1", the adder circuit 2 adds α of the divisor D to the signal $S_a$. On the other hand, when the LSB of the signal $S_a$ is "0", the adder circuit 2 passes the signal $S_a$ without the adding operation. Also, the right shift circuit 3 right-shifts the output signal $S_b$ of the adder circuit 3. Further, the comparator 7 compares the signal $S_c$ with α of the divisor D. As a result, if $S_c<\alpha$, then the output signal $S_f$ of the comparator 7 is caused to be "1", i.e., the non-multiple determination MY is caused to be "1". If $S_c=\alpha$, then the output signal $S_g$ of the comparator 7 is caused to be "1", i.e., the multiple. determination signal MX is caused to be "1". Otherwise, the output signals $S_f$ and $S_g$ remain "0"(low). After a predetermined time corresponding to the adder circuit 2, the right-shift circuit 3 and the comparator 7 has passed, the control proceeds to steps 603 and 604.

At steps 603 and 604 if the, signal MX or MY is "1", the control proceeds to step 607.

Next, at step 605, the control circuit 8 generates a clock signal CK. As a result, the memory circuit 4 stores the output signal $S_c$. Then, at step 606, the control circuit 8 make the start signal ST low. As a result, the selector 1 selects the output signal $S_d$ (=$S_c$) of the memory circuit 4.

Also, in this state, when the LSB of the signal $S_a$ is "1", the adder circuit 2 adds α of the divisor D to the signal $S_a$. On the other hand, when the LSB of the signal $S_a$ is "0", the adder circuit 2 passes the signal $S_a$ without the adding operation. Also, the right shift circuit 3 right-shifts the output signal $S_b$ of the adder circuit 3. Further, the comparator 7 compares the signal $S_c$ with α of the divisor D. As a result, if $S_c<\alpha$, then the output signal $S_f$ of the comparator 7 is caused to be "1", i.e., the non-multiple determination MY is caused to e "1". If $S_c=\alpha$, then the output signal $S_g$ of the comparator 7 is caused to be "1", i.e., the multiple determination signal MX is caused to be "1". Otherwise, the output signals $S_f$ and $S_g$ remain "0"(low). After a predetermined time corresponding to the operation of the adder circuit 2; the right-shift circuit 3 and the comparator 7 has passed, the control proceeds to steps 603 and 604.

Thus, the operation at steps 605 and 606 is repeated until MX="1" or MY="1" is satisfied.

Examples of the operation of the control circuit 8 is further explained.

In a first example, assume that

Y=11011100 (="220")

D=101100 (="44")

Therefore, α=1011

β=110111

γ=00

When the operation at step 601 is carried out, $S_a$="0", i.e., MY="0". Therefore, the control proceeds to step 602.

When the operation at step 602 is carried out, $S_a$=110111

α=1011

$S_b$=1000010

$S_c$=100001 (>α)

$S_e$(=MY)="0"

$S_f$(=MY)="0"

Then, the control proceeds via steps 603 and 604 to steps 605 and 606.

When the operation at steps 605 and 606 is carried out, $S_a$=100001

α=1011

$S_b$=101100

$S_c$=10110 (>α)

$S_e$(=MY)="0"

$S_f$(=MY)="0"

Then, the control proceeds via steps 603 and 604 to steps 605 and 606.

When the operation at steps 605 and 606 is again carried out, $S_a$=10110

α=1011

$S_b$=10110

$S_c$=1011 (=α)

$S_e$(=MY)="0"

$S_f$(=MY)="1"

Thus, it is determined that the dividend Y is a multiple of the divisor D.

In a second example, assume that

Y=11011101 (="221")

D=101100 (="44")

Therefore, α=1011

β=110111

β'=01

When the operation at step 601 is carried out, $S_e$="1", i.e., MY="1". Thus, it is determined that the dividend Y is not a multiple of the divisor D.

In a third example, assume that

Y=11100100 (="228")

D=101100 (="44")

Therefore, α=1011

β=111001

γ=00

When the operation at step 601 is carried out, $S_e$="0", i.e., MY="1". Therefore, the control proceeds to step 602.

When the operation at step 602 is carried out, $S_a$=111001

α=1011

$S_b$=1000100

$S_c$=100010 (>α)

$S_e$(=MY)="0"

$S_f$(=MY)="0"

Then, the control proceeds via steps 603 and 604 to steps 605 and 606.

When the operation at steps 605 and 606 is carried out, $S_a$=100010

α=1011

$S_b$=100010

$S_c$=10001 (>α)

$S_e$(=MY)="0"

$S_f$(=MY)="0"

Then, the control proceeds via steps 603 and 604 to steps 605 and 606.

When the operation at steps 605 and 606 is again carried out, $S_a$=10001

α=1011

$S_b$=11100

$S_c$=1110 (>α)

$S_e$(=MY)="0"

$S_f$(=MY)="0"

Then, the control proceeds via steps 603 and 604 to steps 605 and 606.

When the operation at steps 605 and 606 is again carried out, $S_a$=1110

α=1011

$S_b$=1110

$S_c$=111 (>α)

$S_e$(=MY)="1"

$S_f$(=MY)="0"

Thus, it is determined that the dividend Y is not a multiple of the divisor D.

Further, when the operation can be completed by proceeding from step 601 to step 607, the average operation time can be reduced as compared with the apparatus of FIG. 1.

When the first embodiment is applied to a multiplied determination apparatus used for detecting an error in MPEG2 transport stream packet where a 16-bit input signal is a multiple of a packet size of 10111100 (="188"), the apparatus can be constructed by about 2000 CMOS gates. In this case, since a delay time of the adder circuit 2, the right-shift circuit 3 and the comparator 7 is about 10 ns, the frequency of the clock signal CK can be about 100 $MH_z$. Also, in this case, the maximum number of operations for detecting one error is 9.

Also, in FIG. 5, a delay time of an operational section depending upon the adder circuit 2 is about 10 ns, while in FIG. 1, a delay time of an operational section depending the subtracter 104 and the selector circuit 105 is about 20 ns. Thus, the operation speed of the first embodiment can be improved as compared with the apparatus of FIG. 1. Further, the hardware of FIG. 5 can be reduced as compared with that of FIG. 1.

Figure 7:
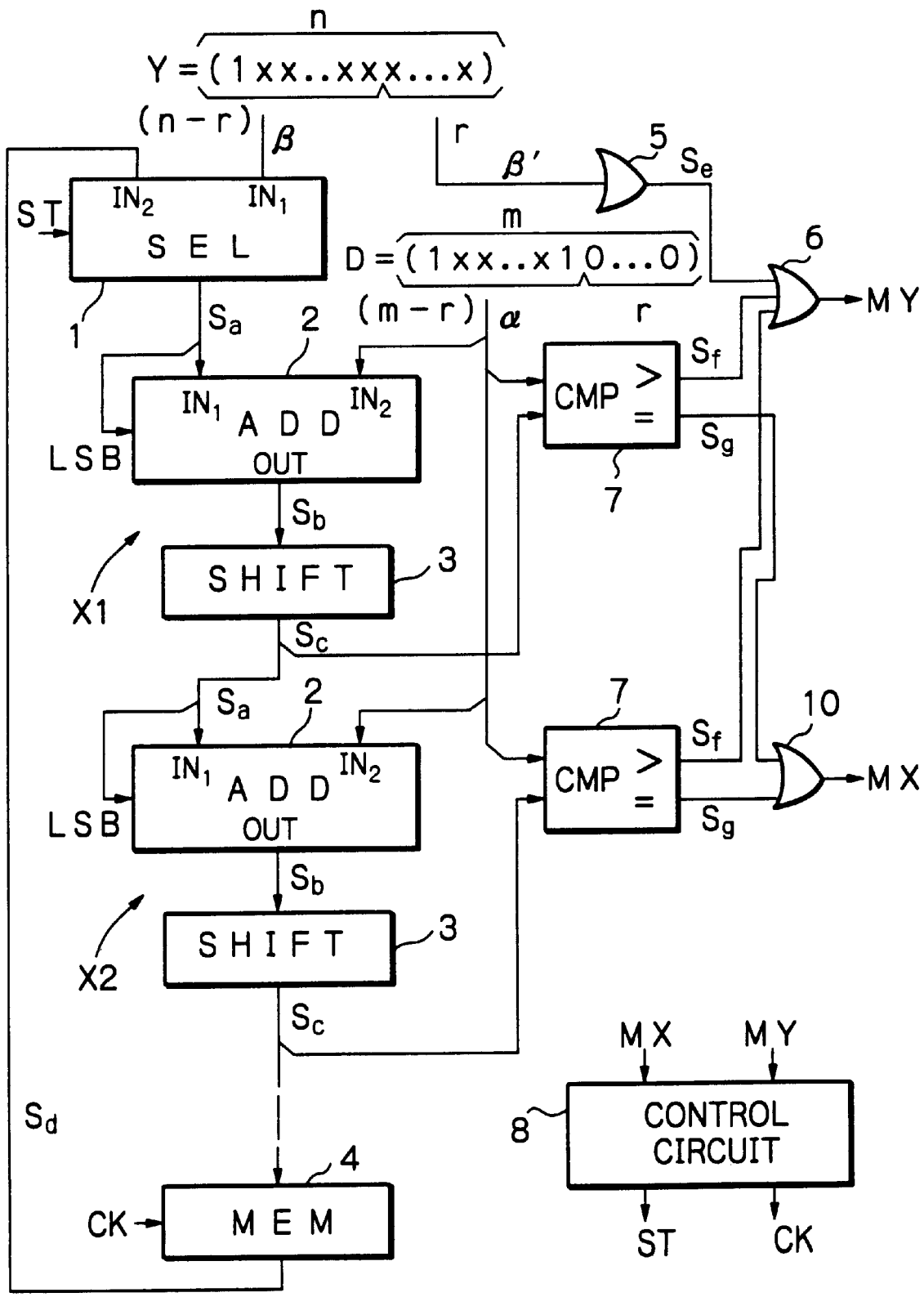
FIG. 7 is a block circuit diagram illustrating a modification of the apparatus of FIG. 5.

In FIG. 7, which illustrates a modification of the apparatus of FIG. 5, a plurality of operational circuits X1, X2, . . . , each formed by the adder circuit 2, the right-shift circuit 3 and the comparator 7 of FIG. 5, are serially connected. In this case, the OR circuit 6 receives a plurality of signals $S_f$, and also, an OR circuit 10 is added to receive a plurality of signals $S_g$.

In FIG. 7, if the number of the operational circuits is N, the frequency of the clock signal CK can be reduced to 1/n of that in the apparatus of FIG. 5.

Figure 8:
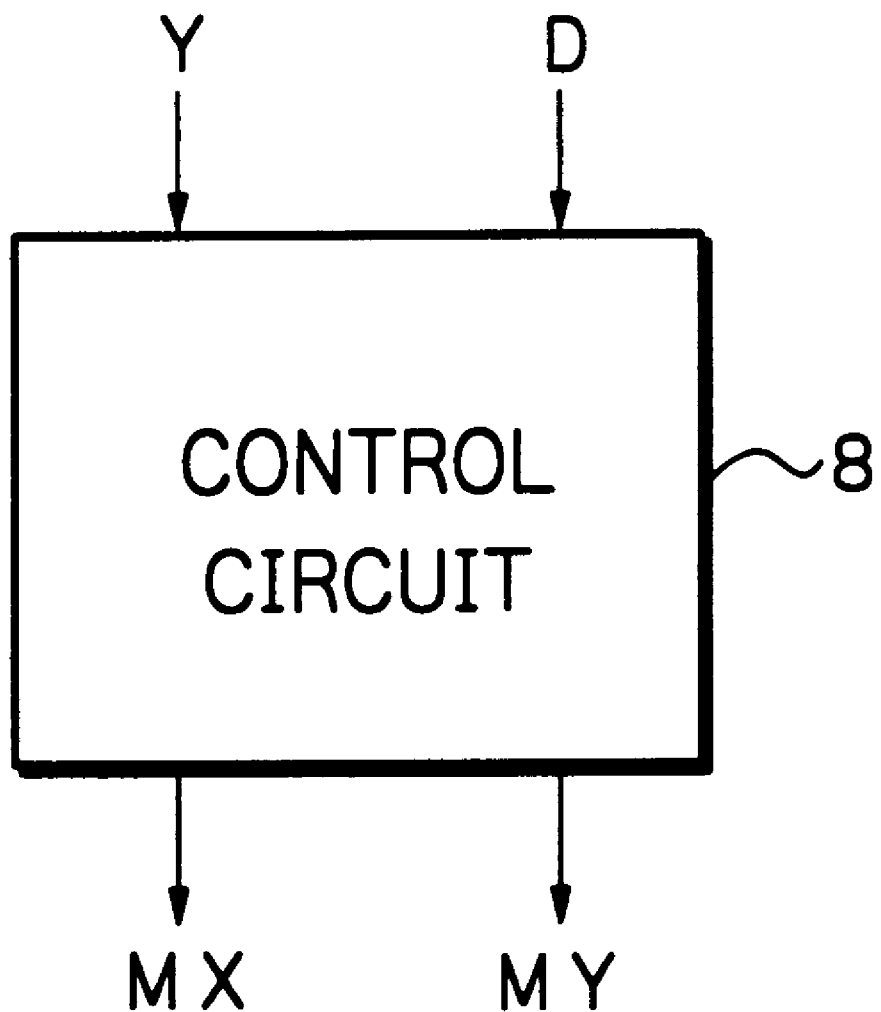
FIG. 8 is a block circuit diagram illustrating a second embodiment of the multiple determination apparatus according to the present invention.

In FIG. 8, which illustrates a second embodiment of the present invention, only a control circuit 8' constructed by a microprocessor, a ROM, a RAM and the like is provided. That is, in FIG. 8, the function of the elements 1 to 7 of FIG. 5 is carried out by software as illustrated in FIG. 9.

In FIG. 9A at step 901, a multiple determination signal MX and a non-multiple determination signal MY are cleared.

Next, at step 902, an m-bit divisor D is fetched. Then, at step 903, a number r of the lower bits of the divisor D each having a value 0 is calculated. Then, at step 904, α←(m-r) upper bits of D Next, at step 905, an n-bit dividend Y is fetched. Then, at step 906, it is determined whether or not the "r" lower bits (=β') of the dividend Y is "0". As a result, if β' is not "0", the control proceeds to step 914 which causes the non-multiple determination signal MY to be "1". Otherwise, the control proceeds to step 907 which calculates:

β←(n-r) upper bits of Y

At step 908, it is determined whether the LSB of β is "0" or "1", i.e., β is an even number or an odd number. As a result if LSB="0", the control proceeds to step 909 which causes a value δ to be β. On the other hand, if LSB="1", the control proceeds to step 910 which causes the value δ to be β+α. In this case, note that, since α is an odd number, δ is an even number.

Next, at step 911, the value δ is divided by 2, i.e., the bits of δ are right-shifted by one bit.

Next, at step 912, the value δ is compared with the value α. As result, when δ·α, the control proceeds to step 913 which causes the multiple determination signal MX to be "1". Also, when δ<α, the control proceeds to step 914 which causes the non-multiple determination signal MY to be "1". Further, when δ>α, the control returns to step 908.

Figure 9B:
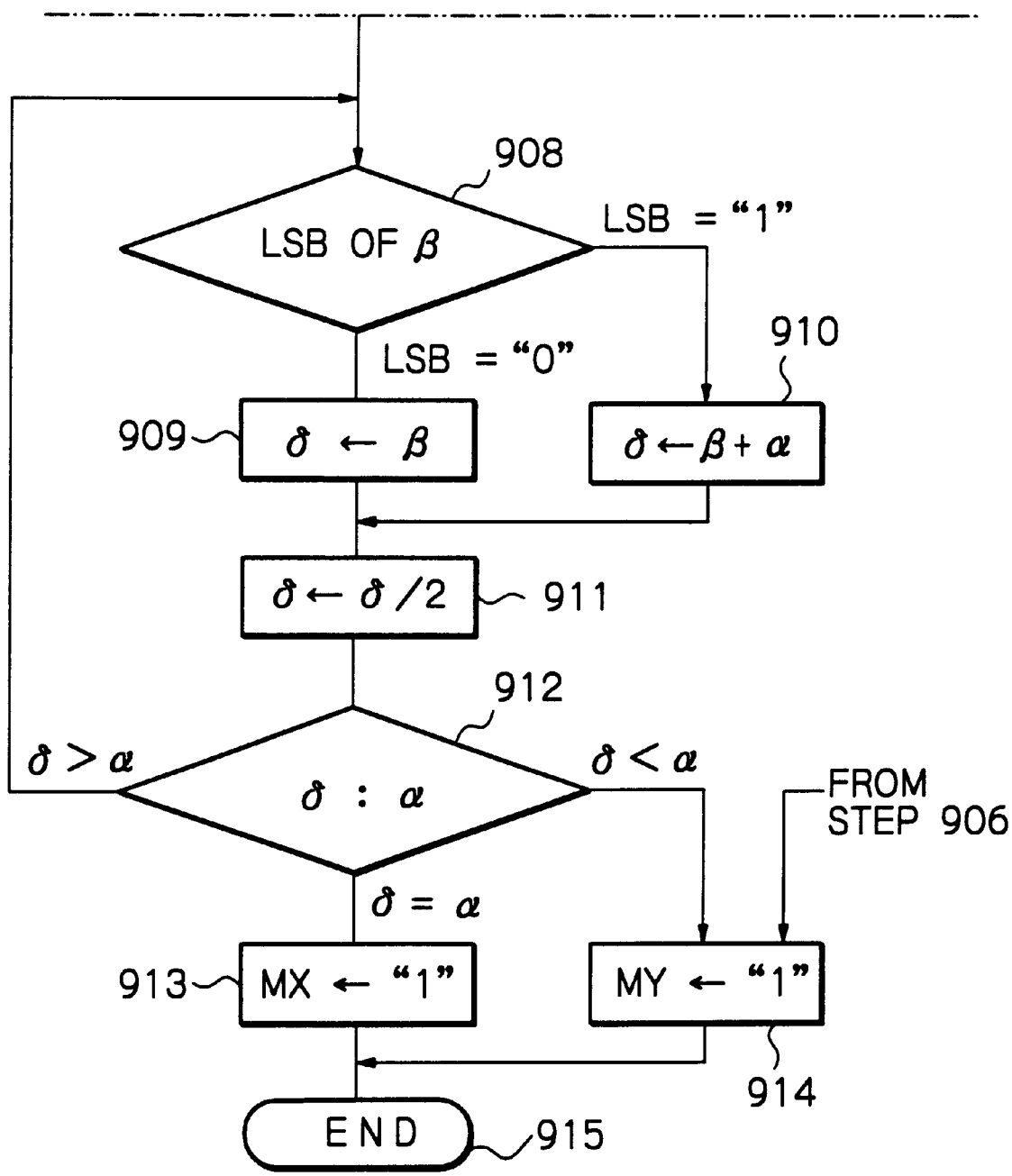

Thus, the routine of FIGS. 9A and 9B is completed by step 915.

As explained hereinabove, according to the present invention, the operation speed can be increased.

What is claimed is:

1. A multiple determination apparatus for determining whether or not a dividend is a multiple of a divisor which is represented by $D=\alpha \cdot 2^r$ where $\alpha$ is an odd number and r is 0, 1, 2, . . . , said apparatus comprising:

first means for determining whether or not a remainder of a division of said dividend by $2^r$ is zero, wherein said remainder represents bits included in a plurality of bits representing said dividend;

second means for replacing a first number associated with said dividend with a quotient of said division; and third means for determining whether or not a greatest common measure between $\alpha$ and said first number coincides with $\alpha$ when said remainder is zero, and determining that said dividend is a multiple of said divisor when said greatest common measure coincides with $\alpha$.

2. The apparatus as set forth in claim 1, wherein said third means comprises:

fourth means for determining whether said first number is an even number or an odd number;

fifth means for dividing said first number by 2 to generate a second number when said first number is an even number;

sixth means for adding $\alpha$ to said first number to generate a third number when said first number is an odd number;

seventh means for dividing said third number by 2 to generate a fourth number;

either means for comparing one of said second number and said fourth number with $\alpha$; and ninth means for repeating operations of said fourth, fifth, sixth, seventh and eighth means by replacing said first number with said one of said second number and said fourth number until said one of said second number and said fourth number becomes not larger than $\alpha$.

3. The apparatus as claimed in claim 1, wherein said second means comprises a selector for selecting a number $\beta$ associated with said dividend to generate a first output signal.

4. The apparatus as claimed in claim 3, wherein said second means further comprises an adder circuit for adding a second number $\alpha$ to said first output signal and for outputting a second output signal.

5. The apparatus as claimed in claim 4, wherein said second means further comprises a right-shift circuit for shifting said second output signal and generating a third output signal.

6. The apparatus as claimed in claim 3, wherein said adder circuit adder circuit adds said second number $\alpha$ only when a least significant bit of said output signal is "1".

7. A computer-implemented multiple determination method for determining whether or not a dividend is a multiple of a divisor which is represented by $D=\alpha \cdot 2^r$ where $\alpha$ is an odd number and r is 0, 1, 2, . . . , said method comprising:

determining whether or not a remainder of a division for said dividend by $2^r$ is zero, wherein said remainder represents bits included in a plurality of bits representing said dividend;

replacing a first number associated with said dividend with a quotient of said division; coomprising a control circuit, connected to said selector circuit and said memory circuit, for generating a strt signal for operating said selector circuit and a clock signal for operating said memory circuit.

8. The computer-implemented method as set forth in claim 7, wherein said greatest common measure determining comprises:

determining whether said first number is an even number or an odd number;

dividing said first number by 2 to generate a second number when said first number is an even number;

adding a to said first number to generate a third number when said first number is an odd number;

dividing said third number by 2 to generate a fourth number;

comparing one of said second number and said fourth number with $\alpha$; and repeating the above operations by replacing said first number with said one of said second number and said fourth number until said one of said second number and said fourth number becomes not larger than $\alpha$.

9. A multiple determination apparatus for determining whether or not an n-bit binary code dividend is a multiple of an m-bit binary code divisor, said divisor being represented by $D = 1xx \ldots x10 \ldots 0$ where "r" lower bits (r32 0, 1, 2, . . . ) are 0, comprising:

a non-zero determination circuit for receiving "r" lower bits of said dividend and determining whether or not at least one of the "r" lower bits of said dividend is zero;

a selector circuit for generating a first signal;

an adder circuit, connected to said selector circuit, for adding (m-r) upper bits of said divisor to said first signal only when a least significant bit of said first signal is "1", and for generating a second signal;

a right-shift circuit, connected to said adder circuit, for right-shifting said second signal by one bit and generating a third signal;

a comparator, connected to said right-shift circuit, for comparing said third signal with the (m-r) upper bits of said divisor; and a memory circuit, connected between said right-shift circuit and said selector circuit, for storing said third signal and generating a fourth signal, a selector circuit selecting one of (n-r) upper bits of said dividend and said fourth signal as said first signal, thus determining that said dividend is a multiple of said divisor when said third signal is equal to the (m-r) upper bits of said divisor, and determining that said dividend is not a multiple of said divisor when at least one of "r" lower bits of said dividend is zero or when a value of said third signal is smaller than the (m-r) upper bits of said divisor.

10. The apparatus as set forth in claim 9, further comprising a control circuit, connected to said selector circuit and said memory circuit, for generating a start signal for operating said selector circuit and a clock signal for operating said memory circuit.

11. The apparatus as set forth in claim 9, further comprising:

an additional adder circuit connected to said right-shift circuit;

an additional right-shift circuit connected between said additional adder circuit and said memory circuit; and an additional comparator connected to said additional right-shift circuit, said additional adder circuit, said additional right-shift circuit and said additional comparator operating in the same way as said adder circuit, said right-shift circuit and said comparator, respectively.

* * * * *